US011140223B2

(12) United States Patent
Shanker et al.

(10) Patent No.: US 11,140,223 B2
(45) Date of Patent: Oct. 5, 2021

(54) SYSTEMS AND METHODS FOR SYNCHRONIZING DATA BETWEEN HUB AND SPOKE ENVIRONMENTS

(71) Applicant: ServiceNow, Inc., Santa Clara, CA (US)

(72) Inventors: Shibunath Shanker, San Jose, CA (US); Shreyans Jain, San Jose, CA (US); Alexander North, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/742,535

(22) Filed: Jan. 14, 2020

(65) Prior Publication Data

US 2021/0218802 A1 Jul. 15, 2021

(51) Int. Cl.
| | |
|---|---|
| *H04L 29/08* | (2006.01) |
| *H04L 29/06* | (2006.01) |
| *H04L 12/24* | (2006.01) |
| *H04L 1/16* | (2006.01) |
| *G06F 16/23* | (2019.01) |
| *H04L 5/00* | (2006.01) |
| *G06F 16/951* | (2019.01) |

(52) U.S. Cl.
CPC ...... *H04L 67/1095* (2013.01); *G06F 16/2308* (2019.01); *G06F 16/2358* (2019.01); *G06F 16/951* (2019.01); *H04L 1/1628* (2013.01); *H04L 5/0055* (2013.01); *H04L 41/0893* (2013.01); *H04L 63/0281* (2013.01); *H04L 63/10* (2013.01); *H04L 67/10* (2013.01); *H04L 67/42* (2013.01)

(58) Field of Classification Search
None
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |

(Continued)

*Primary Examiner* — Lashonda T Jacobs
(74) *Attorney, Agent, or Firm* — Fletcher Yoder PC

(57) ABSTRACT

A cloud computing system includes a hub client instance and at least one spoke client instance that is generated based on copying the hub client instance. The hub client instance includes hub objects maintained using hub object tables, and the spoke client instance includes spoke objects that are copied from the hub objects and are maintained using spoke object tables. To synchronize the spoke client instance with the hub client instance, the spoke client instance requests data indicating changes made to the hub object tables. The request may be one-way, such that the spoke client blocks or prevents requests from the hub client instance. In response to receiving the request, the hub client instance sends the data indicating changes made to the hub object tables to the spoke client instance. The spoke client instance updates the spoke object tables based on the data.

20 Claims, 7 Drawing Sheets

(56) References Cited

U.S. PATENT DOCUMENTS

| | | | |
|---|---|---|---|
| 7,131,037 B1 | 10/2006 | LeFaive | |
| 7,170,864 B2 | 1/2007 | Matharu | |
| 7,216,142 B2 * | 5/2007 | Whipple | G06F 9/465 |
| | | | 707/999.009 |
| 7,350,209 B2 | 3/2008 | Shum | |
| 7,392,300 B2 | 6/2008 | Anantharangachar | |
| 7,468,956 B1 * | 12/2008 | Leelanivas | H04L 12/4675 |
| | | | 370/255 |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,698,398 B1 * | 4/2010 | Lai | G06Q 10/10 |
| | | | 709/223 |
| 7,716,353 B2 | 5/2010 | Golovinsky | |
| 7,769,718 B2 | 8/2010 | Murley | |
| 7,783,744 B2 | 8/2010 | Garg | |
| 7,801,030 B1 * | 9/2010 | Aggarwal | H04L 45/124 |
| | | | 370/228 |
| 7,890,802 B2 | 2/2011 | Gerber | |
| 7,925,981 B2 | 4/2011 | Pourheidari | |
| 7,930,396 B2 | 4/2011 | Trinon | |
| 7,933,927 B2 | 4/2011 | Dee | |
| 7,945,860 B2 | 5/2011 | Vambenepe | |
| 7,962,743 B2 * | 6/2011 | Fluhrer | H04L 63/0442 |
| | | | 713/153 |
| 7,966,398 B2 | 6/2011 | Wiles | |
| 8,051,164 B2 | 11/2011 | Peuter | |
| 8,082,222 B2 | 12/2011 | Rangarajan | |
| 8,085,690 B1 * | 12/2011 | Leelanivas | H04L 12/4675 |
| | | | 370/255 |
| 8,151,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,400,945 B2 * | 3/2013 | Barnes | H04L 45/48 |
| | | | 370/256 |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,887,133 B2 | 11/2014 | Behnia | |
| 8,984,598 B2 * | 3/2015 | Branch | H04L 41/0843 |
| | | | 726/5 |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,185,078 B2 * | 11/2015 | Wong | H04L 63/0281 |
| 9,239,857 B2 | 1/2016 | Trinon | |
| 9,317,327 B2 | 4/2016 | Apte | |
| 9,323,801 B2 | 4/2016 | Morozov | |
| 9,363,252 B2 | 6/2016 | Mueeler | |
| 9,419,857 B1 * | 8/2016 | Ryan | H04L 63/08 |
| 9,412,084 B2 | 9/2016 | Kowalski | |
| 9,467,344 B2 | 10/2016 | Gere | |
| 9,535,737 B2 | 1/2017 | Joy | |
| 9,613,070 B2 | 4/2017 | Kumar | |
| 9,645,833 B2 | 5/2017 | Mueller | |
| 9,646,169 B2 * | 5/2017 | Wong | H04L 63/10 |
| 9,654,473 B2 | 5/2017 | Miller | |
| 9,659,051 B2 | 5/2017 | Hutchins | |
| 9,674,108 B1 * | 6/2017 | Ryan | G06Q 50/12 |
| 9,674,285 B2 * | 6/2017 | Detienne | H04L 67/142 |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 10,002,203 B2 | 6/2018 | George | |
| 10,592,829 B2 * | 3/2020 | Mueller | G06Q 10/063114 |
| 2003/0126137 A1 * | 7/2003 | McFadden | G06F 16/288 |
| 2005/0055382 A1 * | 3/2005 | Ferrat | G06F 16/27 |
| 2005/0086285 A1 * | 4/2005 | Balasubramanian | |
| | | | G06F 9/5055 |
| | | | 709/200 |
| 2007/0255812 A1 * | 11/2007 | Mirtorabi | H04L 45/02 |
| | | | 709/220 |
| 2008/0082989 A1 * | 4/2008 | Walker | G06F 16/289 |
| | | | 719/314 |
| 2009/0097417 A1 * | 4/2009 | Asati | H04L 45/02 |
| | | | 370/255 |
| 2009/0129383 A1 * | 5/2009 | Maalouf | H04L 12/1886 |
| | | | 370/390 |
| 2012/0185290 A1 * | 7/2012 | Mueller | G06Q 10/063114 |
| | | | 705/7.15 |
| 2013/0086280 A1 * | 4/2013 | James | H04L 45/10 |
| | | | 709/238 |
| 2014/0173702 A1 * | 6/2014 | Wong | H04L 63/10 |
| | | | 726/4 |
| 2015/0304174 A1 * | 10/2015 | Zhao | H04L 12/465 |
| | | | 709/226 |
| 2016/0098327 A1 * | 4/2016 | Detienne | H04L 67/142 |
| | | | 714/4.2 |
| 2016/0261506 A1 * | 9/2016 | Hegde | H04L 47/125 |
| 2017/0244810 A1 * | 8/2017 | Ryan | G06Q 30/04 |

* cited by examiner

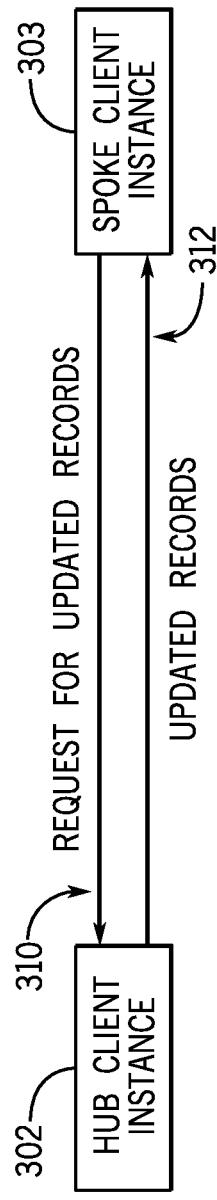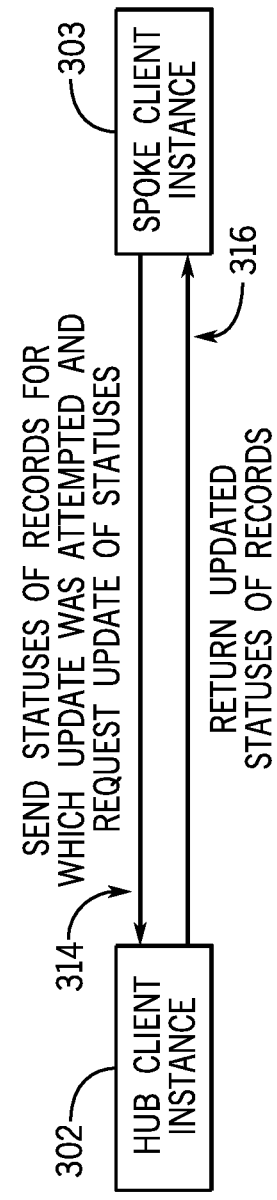
FIG. 5
FIG. 6

SYSTEMS AND METHODS FOR SYNCHRONIZING DATA BETWEEN HUB AND SPOKE ENVIRONMENTS

BACKGROUND

The present disclosure relates generally to maintaining a security environment for a network environment and service provider cloud infrastructure client instance.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g., computing devices, load balancers, firewalls, switches, etc.) and software resources (e.g., productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A cloud computing system is disclosed that includes a hub client instance and at least one spoke client instance that is generated based on copying the hub client instance. The hub client instance may include multiple objects ("hub objects"), and the spoke client instance may include multiple objects ("spoke objects") that are copied from the hub objects. The hub objects may be maintained using hub object tables in the hub client instance, while the spoke objects may be maintained using spoke object tables in the spoke client instance. To synchronize the spoke client instance with the hub client instance, the spoke client instance may request data indicating changes made to the hub object tables. The request may be one-way, such that the spoke client may block or prevent requests from the hub client instance. In response to receiving the request, the hub client instance may send the data indicating changes made to the hub object tables to the spoke client instance. The spoke client instance may update the spoke object tables based on the data.

In this manner, the cloud computing system may maintain synchronization between the hub client instance and a spoke client instance, such that the cloud computing system may only allow the spoke client instance to synchronize by sending a request to the hub client instance (e.g., one way requests).

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 5 is a flow diagram of a spoke client instance requesting records from the hub client instance of FIG. 4, according to embodiments of the present disclosure;

FIG. 6 is a flow diagram of the spoke client instance of FIG. 4 sending statuses of records for which updates were attempted and requesting updates of the statuses to the hub client instance, according to embodiments of the present disclosure;

DETAILED DESCRIPTION

Figure 1:
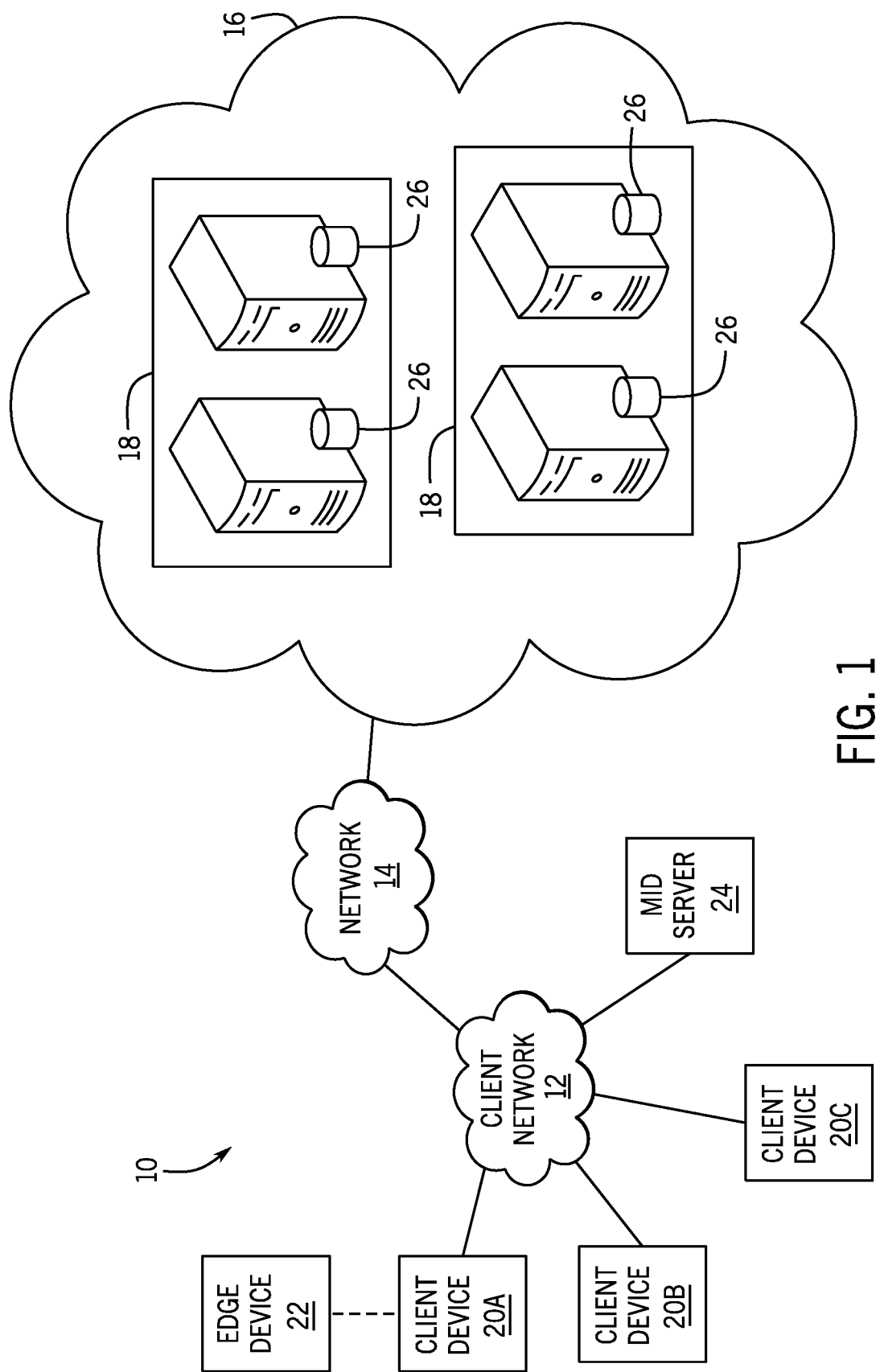
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

In certain situations, a client instance implemented on a cloud-based infrastructure that may be managed by a service provider and operating as a "hub" (a hub client instance) may be copied or cloned, and each copy or clone (e.g., a spoke client instance) may operate separately to enable access to different departments, offices, or employees of a client. However, some of the spoke client instances may operate in more restrictive environments (e.g., different jurisdictional or regulatory entities (such as different countries, states, counties, cities, and to forth)) than others. The more restrictive environments may have different or higher security requirements that enforce certain rules not enforced in other environments in which the client operates. For example, in a less restrictive environment, a spoke client instance may synchronize with the hub client instance by receiving data from the hub client instance in response to sending requests to and receiving requests from the hub client instance. However, in the more restrictive environment, the spoke client instance may not be permitted to receive any requests (e.g., from the hub client instance), and may only send requests to the hub client instance for data associated with synchronization purposes.

With the preceding in mind, a cloud computing system is disclosed that includes a hub client instance and at least one spoke client instance that is generated based on copying the hub client instance. The hub client instance may include multiple objects ("hub objects"), and the spoke client instance may include multiple objects ("spoke objects") that are copied from the hub objects. The hub objects may be maintained using hub object tables in the hub client instance, while the spoke objects may be maintained using spoke object tables in the spoke client instance. To synchronize the spoke client instance with the hub client instance, the spoke client instance may request data indicating changes made to the hub object tables. The request may be one-way, such that the spoke client may block or prevent requests from the hub client instance. In response to receiving the request, the hub client instance may send the data indicating changes made to the hub object tables to the spoke client instance. The spoke client instance may update the spoke object tables based on the data.

If the spoke object tables were updated, the spoke client instance may send a confirmation to the hub client instance. In some cases, as the spoke client instance updates the spoke object tables, the spoke client instance may generate an error with respect to updating a certain spoke object table. As such, the spoke client instance may stop updating any other spoke object tables, and send an indication to the hub client instance of the spoke object tables that were successfully updated, the spoke object table that generated the error, and the spoke object tables that were deferred or not updated due to the update process being stopped. The spoke client instance may subsequently request data for updating the spoke object table that generated the error and the spoke object tables that were deferred. In this manner, the cloud computing system may maintain synchronization between the hub client instance and a spoke client instances that operates in a more restrictive environment.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
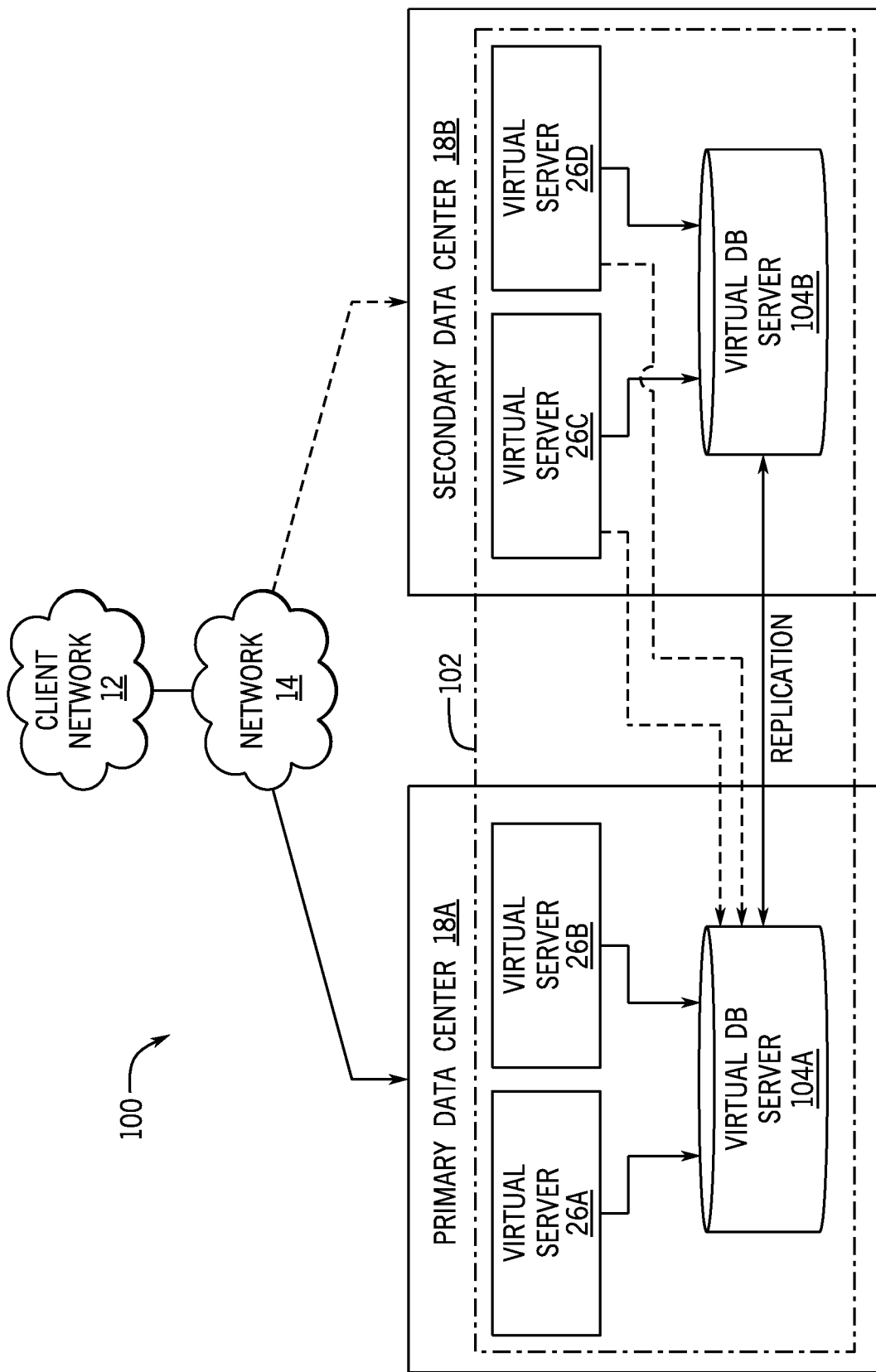
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
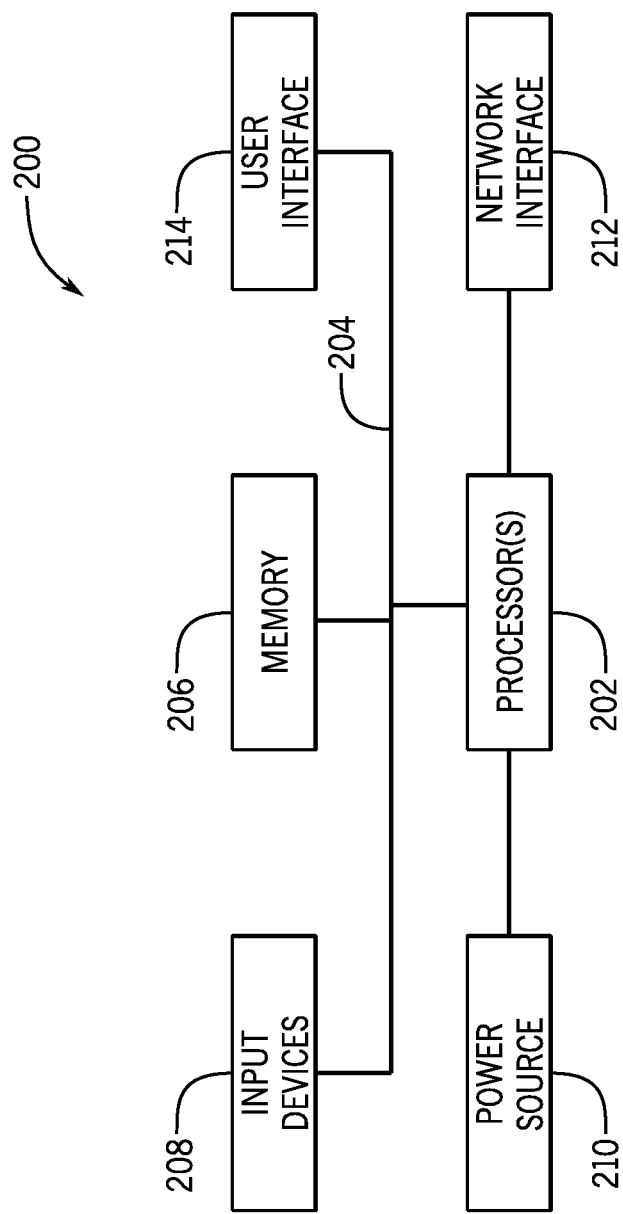
FIG. 3 is a block diagram of a computing device utilized in a computing system that may be present in FIG. 1 or 2, according to embodiments of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. In some embodiments, the instructions may be pipelined from execution stacks of each process in the memory 206 and stored in an instruction cache of the one or more processors 202 to be processed more quickly and efficiently. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

With the preceding technical and background discussion in mind, in certain situations a client instance 102 may be copied or cloned, and each copy or clone may operate separately to enable access to different departments, offices, or employees of a client, such as at different geographic sites or locations. The original client instance 102 may be referred to as a "hub instance", while the copied client instance may be referred to as a "spoke client instance". However, some of the spoke client instances may operate in more restrictive environments than others.

Figure 4:
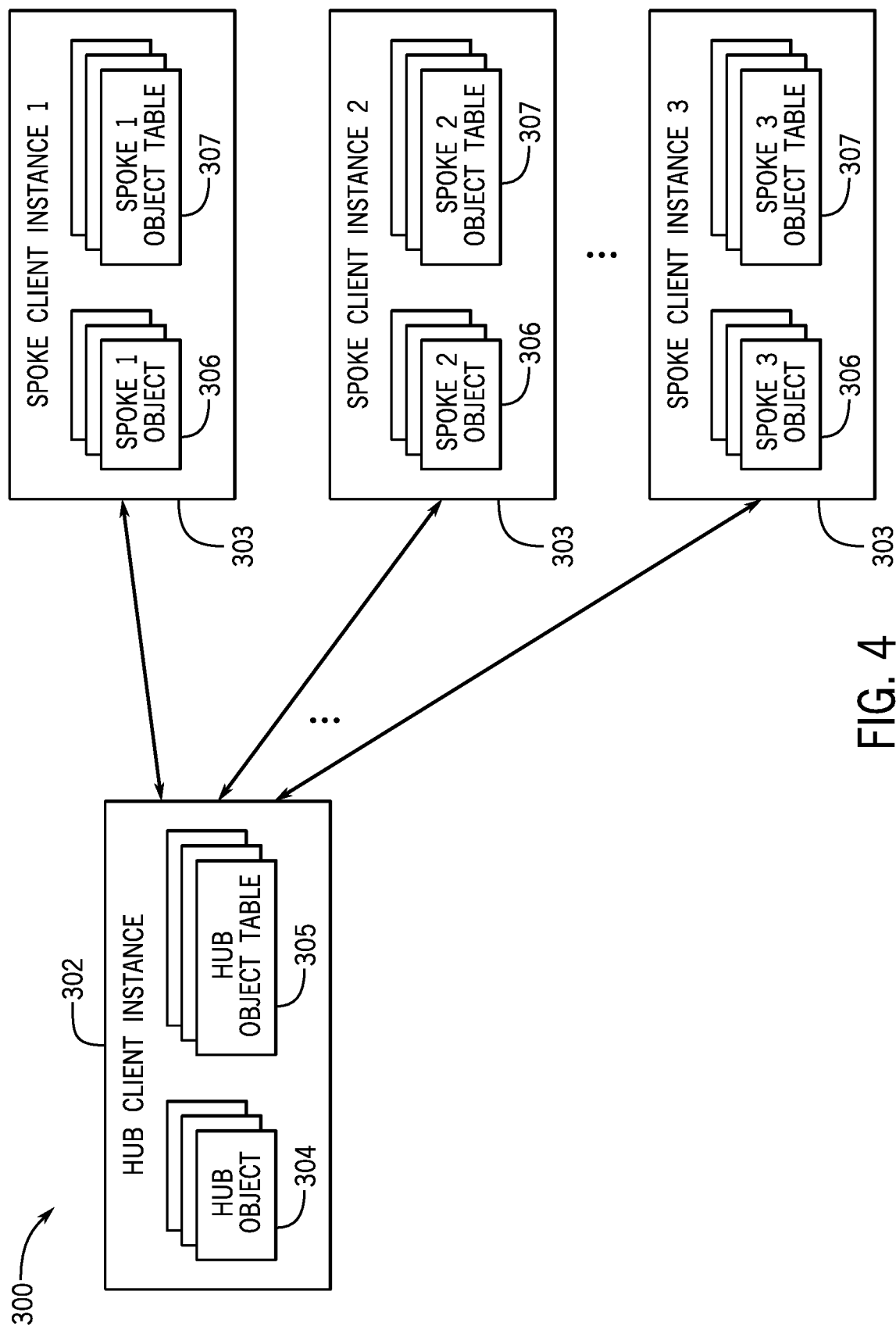
FIG. 4 is a block diagram of a cloud computing system of FIG. 1 and/or FIG. 2, having a hub client instance and multiple spoke client instances, according to embodiments of the present disclosure.

FIG. 4 is a block diagram of a cloud computing system 300 having a hub client instance 302 and multiple spoke client instances 303, according to embodiments of the present disclosure. Each spoke client instance 303 may be a mirror of the hub client instance 302, and be communicatively coupled to the hub client instance 302 by one or more communication networks, such as the network 14. In some cases, at least one of the spoke client instances 303 may be in a more regulated environment (e.g., a different country, state, city, and so forth or based upon the type of information in question (e.g., personal identifying information, financial information, classified information) than the hub client system 302 that it is mirroring. The more regulated environment may have higher security requirements that enforce certain rules that apply to the respective spoke client instance in question based on geographic location, but which do not apply to the hub client instance 302 or other spoke client instances 303 that are not in a more regulated environment. For example, a first spoke client instance 303 (e.g., "Spoke Client Instance 1") in the more regulated environment may not be permitted to receive any requests from the hub client instance 302 that it is mirroring, but a second spoke client instance 303 (e.g., "Spoke Client Instance 2") that is mirroring the same hub client instance 302 and not in a more regulated environment may be permitted to receive requests from the hub client instance 302. That is, the cloud computing system 300 may enable only one-way communication or data requests from Spoke Client Instance 1 to the hub client instance 302 (and prevent communication or data requests from the hub client instance 302 to Spoke Client Instance 1, while enabling two-way communication or data requests between Spoke Client Instance 2 and the hub client instance 302.

In some cases, the more regulated environment may be associated with regulations that may be enforced by a governmental agency, a different country, a different region, a different department, and so on. As such, while a first set of client devices 20 may access the hub client instance 302 in a less restrictive environment (e.g., at a first country or department) via a first communication network (e.g., a first client network 12), a second set of client devices 20 may access the spoke client instance 303 in a more restrictive environment (e.g., at a second country or department) via a second communication network (e.g., a second client network 12).

Data in the spoke client instances 303 may be updated or synchronized (e.g., periodically or based on certain triggering events) to continue mirroring the hub client instance 302. For example, a spoke client instance 303 may be updated every minute, every thirty minutes, every hour, every two hours, every six hours, every twelve hours, every day, every week, every month, and so on. As another example, a spoke client instance 303 may be update each time a threshold number of changes have been made to the hub client instance 302, each time certain data in the hub client instance 302 (e.g., in a certain object table) has been updated, and so on.

In a normal environment (e.g., an environment that is less restricted), a spoke client instance 303 may synchronize with the hub client instance 302 by receiving data from the hub client instance 302 in response to sending requests to and receiving requests from the hub client instance 302. However, in a more restrictive environment, the spoke client instance 303 may not be permitted to receive any requests (e.g., from the hub client instance 302). That is, the spoke client instance 303 may block or prevent requests from being received, or ignore any received requests for data. Instead, the spoke client instance 303 may send requests to the hub client instance 302 for data associated with synchronization purposes.

The more restrictive environment may operate under additional or alternative rules, such that the data requested by the spoke client instance 303 may be requested and processed by the spoke client instance 303 on a first in first out basis. Additionally or alternatively, there may be no parallel processing of records from the same table of the hub client instance 302. Controls may be implemented to limit the number of records being retrieved by a single client process.

A single hub client instance 302 may accommodate multiple spoke client instance 303. In some embodiments, credentials and configuration storage and management may comply with service provider standards (e.g., storing passwords in an encrypted password field). As another example, actions may be restricted to those with minimal impact. That is, producing a single record for consumption by multiple spoke client instances 303 may result in a convoluted cleanup approach once all spoke client instances 303 have consumed the record, compared to producing multiple copies of the same record, because it may be more efficient and less complex to purge individual records once they are consumed. In addition to synchronization of data, due care may be taken to maintain a simple to understand record numbering approach (e.g., avoid using a duplicate record numbers). Further, all tables which are synchronized may be included in a number management script to prevent duplicate numbering, and changes to the number management script may be propagated from the hub client instance 302 and across all spoke client instance 303 as soon as possible to avoid collisions.

In particular, the hub client instance 302 may include one or more objects 304 ("hub objects"). An object 304 may include a data structure, such as a Javascript construct, programmed or written to hold and/or manipulate data. Each hub object 304 may be defined or have attributes configured by an associated table 305 ("hub object table"). Similarly, each spoke client instance 303 may include one or more objects 306 ("spoke objects") that may be defined or have attributes configured by an associated table 307 ("spoke object table"). At least some of the spoke object tables 307 may mirror the hub object tables 305 by storing the same data. As such, to synchronize a spoke client instance 303 with the hub client instance 302, changes to at least some of the hub object tables 305 may be made to the spoke object tables 307.

FIG. 5 is a flow diagram depicting a spoke client instance 303 requesting records from the hub client instance 302 of FIG. 4, according to embodiments of the present disclosure. As illustrated, the spoke client instance 303 sends a communication 310 requesting updated records. In particular, the updated records may include changes that the hub client instance 302 made to one or more hub object tables 305 (e.g., since the last time the spoke client instance 303 was synchronized with the hub client instance 302). In response to receiving the request in the communication 310, the hub client instance 302 may send a communication 312 having the updated records. The spoke client instance 303 may store the updated records in a "staging table", and the stored records may be referred to as "staging records".

The spoke client instance 303 may then update spoke object tables 307 that correspond to (e.g., that should mirror) the hub object tables 305. In particular, the spoke client instance 303 may update the corresponding spoke object tables 307 with the staging records sent in the communication 312, such that the corresponding spoke object tables 307 store the same records as the hub object tables 305. In this manner, the spoke client instance 303 may be synchronized with the hub client instance 302.

As the spoke client instance 303 updates each record of a spoke object table 307, the spoke client instance 303 may indicate or otherwise flag the staging record as successfully updated. However, in some cases, the spoke client instance 303 may not update the spoke object tables 307 successfully. For instance, the staging records may have been corrupted during transmission, there may be an invalid entry sent from the hub client instance 302, the spoke object table 307 may have been inadvertently corrupted, and so on. In such cases, the spoke client instance 303 may generate an error when a record of a spoke object table 307 is not updated successfully. In such cases, the spoke client instance 303 may indicate or flag the corresponding staging record as generating the error. Moreover, in some embodiments, the spoke client instance 303 may stop updating the remaining records, and indicate or flag the remaining staging records as deferred. In alternative or additional embodiments, the spoke client instance 303 may continue updating the remaining records of the spoke object table 307, and indicate or flag the remaining staging records as successfully updated or generating errors based on the success or failure of updating the records.

FIG. 6 is a flow diagram of the spoke client instance 303 of FIG. 4 sending statuses of records for which updates were attempted and requesting updates of the statuses to the hub client instance 302, according to embodiments of the present disclosure. In particular, the spoke client instance 303 may send a communication 314 indicating the successful, error, and/or deferred statuses of the staging records (e.g., based on the updated records 312 sent by the hub client instance 302). The communication 314 may also include a request to update the statuses of corresponding staging records stored in the hub client instance 302 based on the statuses received in the communication 314. In response to the communication 314, the hub client instance 302 may update the statuses of the corresponding staging records stored in the hub client instance 302 based on the statuses received in the communication 314. The hub client instance 302 may also return a communication 316 with the updated statuses of the staging records to the spoke client instance 303. At a later time, the spoke client instance 303 may reattempt to update the records and/or send a subsequent communication (such as the communication 310) requesting updates for the records that were not successfully updated (e.g., corresponding to the staging records with error statuses and/or deferred statuses).

Figure 7:
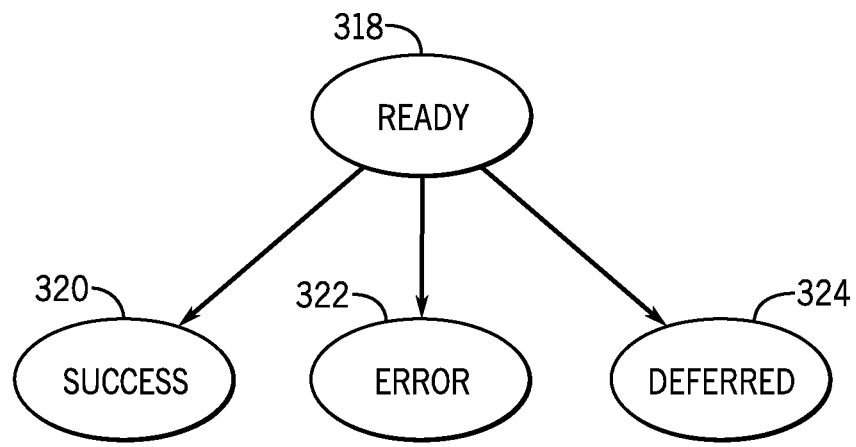
FIG. 7 is a state diagram of a staging record in the spoke client instance of FIG. 4, according to embodiments of the present disclosure.

With the foregoing in mind, FIG. 7 is a state diagram of a staging record in the spoke client instance of FIG. 4, according to embodiments of the present disclosure. After the staging records have been stored (e.g., as received from the communication 312), each staging record may have a status of "ready" 318. The spoke client instance 303 may attempt to update the records of the one or more spoke object table 307 corresponding to the staging records. As the records of the one or more spoke object table 307 are successfully updated, the spoke client instance 303 may change the status of the corresponding staging records to "success" 320. If a record fails to update, then the spoke client instance 303 may change the status of the corresponding staging record to "error" 322. The spoke client instance 303 may then stop updating the remaining records using the remaining staging records, and change the statuses of the remaining staging records to "deferred" 324.

Figure 8:
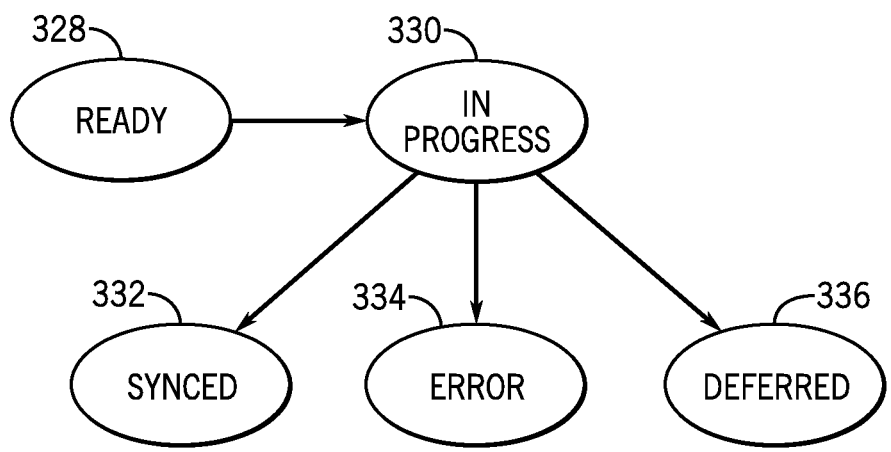
FIG. 8 is a state diagram of a staging record in the hub client instance of FIG. 4, according to embodiments of the present disclosure.

The spoke client instance 303 may send the statuses of the staging records to the hub client instance 302 in the communication 314. In response, the hub client instance 302 may update corresponding staging records stored by the hub client instance 302. FIG. 8 is a state diagram of a staging record in the hub client instance 302 of FIG. 4, according to embodiments of the present disclosure. The hub client instance 302 may initially stage records, for example, due to changes made to records of one or more hub object tables 305. The changes may include inserting a record, modifying a record, or deleting a record. As such, the hub client instance 302 may assign a "ready" status 328 to the staging records.

When the hub client instance 302 receives a request for updated (e.g., staging) records, such as in the communication 310, the hub client instance 302 sends at least some of the staging records to the spoke client instance 303 in the communication 312. The hub client instance 302 may send any suitable number of staging records in any suitable data structure to the spoke client instance 303 in the communication 312. For example, the hub client instance 302 may send one, two, ten, 25, 50, 100, 200, 500, 1000, and so on, staging records to the spoke client instance 303 in the communication 312. The hub client instance 302 may then change the status of the staging records sent to the spoke client instance 303 to "in progress" 330.

After attempting to update records of one or more corresponding spoke object tables 307 based on the staging records, the spoke client instance 303 may send the statuses of the staging records to the hub client instance 302 in the communication 314. For the staging records that correspond to a successful status as indicated by the spoke client instance 303, the hub client instance 302 may change the status of the staging records to "synced" 332. For the staging records that correspond to an error status as indicated by the spoke client instance 303, the hub client instance 302 may change the status of the staging records to "error" 334. For the staging records that correspond to a deferred status as indicated by the spoke client instance 303, the hub client instance 302 may change the status of the staging records to "deferred" 336. At a later time, the spoke client instance 303 may reattempt to update the records and/or send a subsequent communication (such as the communication 310) requesting updates for the records that were not successfully updated (e.g., corresponding to the staging records with error statuses and/or deferred statuses).

Figure 9:
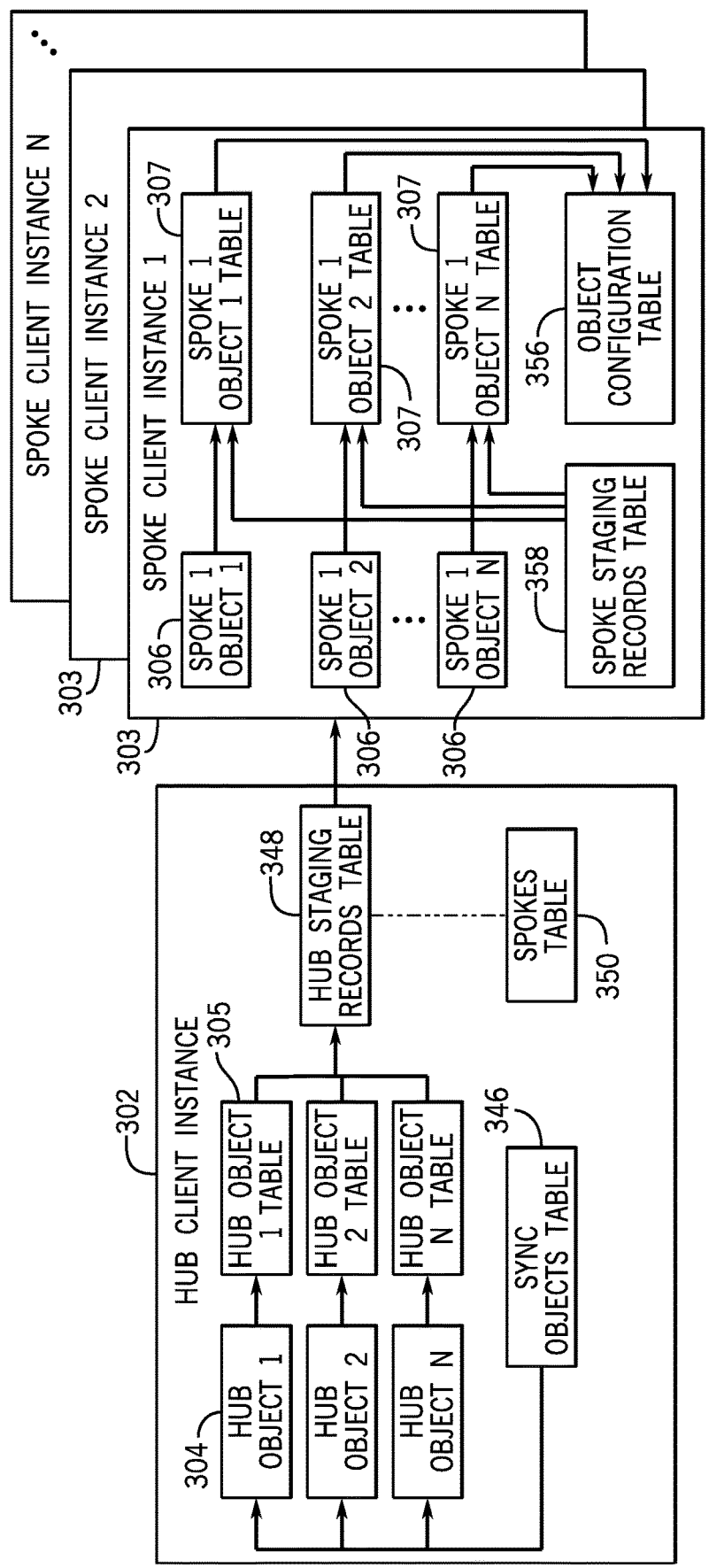
FIG. 9 is a block diagram of cloud computing system of FIG. 4, illustrating tables and relationships for managing a hub client instance and multiple spoke client instances, according to embodiments of the present disclosure.

FIG. 9 is a block diagram of cloud computing system 300 of FIG. 4, illustrating tables and relationships for managing a hub client instance 302 and multiple spoke client instances 303, according to embodiments of the present disclosure. It should be noted that any suitable number of hub objects 304, hub object tables 305, spoke objects 306, spoke client instances 303, and spoke object tables 307 is contemplated. Each hub object table 305 of the hub client instance 302 may store attributes of a corresponding hub objects 304, and setting the attributes to different values may provide different configurations of the hub object 304.

As illustrated, the hub client instance 302 may include a synchronized objects table 346, a hub staging records table 348, and a spokes table 350. The spoke client instance 303 may include an object configuration table 358 and a spoke staging records table 358. The synchronized objects table 346 may tabulate the hub objects 304 in the hub client instance 302 for synchronization with one or more respective spoke client instances 303. The hub staging records table 348 may stage records that were inserted, updated, and/or deleted in the hub object tables 305, and thus should be synchronized with one or more spoke client instances 303. The spokes table 350 may tabulate the spoke client instances 303 which should be synchronized with the hub client interface 302. The object configuration table 358 may tabulate configurations of the hub objects 304 that are synchronized with the one or more spoke client instances 303 (e.g., fields that should be synchronized, fields that should be excluded during synchronization, fields that should be set to default values, and the like). The spoke staging records table 358 may cache the staging records received from hub client instance 302 and track the type of synchronization operation (e.g., insertion, update, and/or deletion) to be performed. Table 1 below lists the tables for managing the hub client instance 302 and the spoke client instances 303, and their respective purposes.

TABLE 1

Tables for Managing the Hub Client Instance and Spoke Client Instances

| Table Name | Purpose | Environment |
| --- | --- | --- |
| Hub Staging Records Table | Stages records which were inserted/updated/deleted in the hub object tables that are synchronized with spoke client instances | Hub Client Interface |
| Spokes Table | Tabulates spoke client instances that synchronize with the hub client interface | Hub Client Interface |
| Synchronized Objects Table | Tabulates hub objects in hub client interface that are synchronized with respective spoke client instances | Hub Client Interface |
| Spoke Staging Records Table | Caches hub object records (e.g., in JavaScript Object Notation (JSON) format) received from the hub client instance and tracks type of synchronization operation (e.g., insert/update/delete) to be performed | Spoke Client Instance |
| Object Configuration Table | Tabulates configurations of hub objects to be synchronized with spoke client instances (e.g., fields to be synchronized, fields to be excluded from synchronized, fields to be set to default values, etc.) | Spoke Client Instance |

In some embodiments, the hub staging records table 348 (stored in the hub client interface 302) may include the following fields shown in Table 2 below: "Instance ID", "Table Name", "Operation", "Record Payload", "Response Message", "Sync Record", and/or "State". The Instance ID field may identify which specific spoke client instance 303, and which spoke object table 307 in the specific spoke client instance 303, that a record is being staged for. The Table Name may identify which hub object table 305 and which spoke object table 307 the record getting staged belongs to. The Operation field may detail what operation (e.g., insertion, update, and/or deletion) that is to be performed for the staging record. The Record Payload field may store a representation of the staging record to be synchronized with the spoke client instance 303. The representation may be populated while staging the record, and may be an open-standard file format or data interchange format that uses human-readable text to transmit data objects having attribute-value pairs and/or array data types. For example, the representation may be in JavaScript Object Notation (JSON) format. The Response Message field may store a received message from a spoke client instance 303 regarding a result of an operation on a spoke client instance 303. The State function may track the state of the synchronization process for the staging record, as described in FIGS. 8 and/or 9. The Sync Record field may include a pointer to the record getting staged.

TABLE 2

Hub Staging Records Table

| Field | Purpose | Type |
|---|---|---|
| Instance ID | The instance ID of the spoke client instance for which the record is specifically staged for | String |
| Table Name | The name of the table the record getting staged belongs to | String |
| Operation | The operation which needs to be performed | String (with choice list) Choices: 1. Insert/Update 2. Delete |
| Record Payload | Stores the representation of the staging record which needs to be synchronized over to the spoke client instance. Gets populated while staging the record | String |
| Response Message | Message received from the spoke client system regarding the result of the operation on the spoke client system | String |
| Sync Record | Pointer to the record getting staged | Document identifier |
| State | Tracks the state of the synchronizing process for the staging record | String (with choice list) 1) Ready 2) In Progress 3) Synced 4) Deferred 5) Error |

Additionally or alternatively, the spokes table 350 (stored in the hub client interface 302) may include the following fields shown in Table 3: "Active", "Spoke Instance ID", and/or "Sync Retrieval Limit". In particular, the Active field may allow or disallow the spoke client instance 303 to synchronize with the hub client instance 302. The Spoke Instance ID field may identify the spoke client instance 303. The Sync Retrieval Limit field may control the number of staging records to be returned per synchronization request.

TABLE 3

Spokes Table

| Field | Purpose | Type |
|---|---|---|
| Active | Configuration to allow or disallow the spoke client instance to synchronize with hub client instance | True/False |
| Spoke Instance ID | Instance ID of the spoke client instance | String |
| Sync Retrieval Limit | Configuration which controls the number of staging records to be returned per synchronization request | Integer |

The synchronized objects table 346 (stored in the hub client interface 302) may include the following fields showing in Table 4: "Active", "Spoke Instance ID", "Get Everything", and/or "Payload Fields". In particular, the Active field may allow or disallow a hub object table's 305 data to be staged for a specific spoke client instance 303. The Spoke Instance ID field may identify the spoke client instance 303 for which the hub object table 305 record is staged. The Get Everything field, if true, may return fields (e.g., all fields) of a hub object table 305 as part of the payload, and, if false, stage the fields present in the Payload Fields field. The Payload Fields field may list the fields to be staged for synchronization, where the fields may be separated by commas.

TABLE 4

Synchronized Objects Table

| Field | Purpose | Type |
|---|---|---|
| Active | Configuration to allow or disallow a table's data to be staged for a specific spoke client instance | True/False |
| Spoke Instance ID | Instance ID of the spoke client instance for which a table record is staged | String |
| Get Everything | Configuration to return all fields of a table as part of the payload. If false, stages the fields present in the Payload Fields column | True/False |
| Payload Fields | List of fields to be staged for synchronization | String |

TABLE 5

Spoke Staging Records Table

| Field | Purpose | Type |
|---|---|---|
| Table Name | The name of the table which the record getting synchronized belongs to | String |
| Table ID | ID of the record (or hub object table) getting synchronized | String |
| State | State of the operation for that staging record (e.g., whether synchronization was successful for that record or not) | String (with Choice list) 1) Ready 2) Success 3) Failure 4) Deferred |
| Message | Message recorded in case of failure | String |
| Sync JSON | Representation of the staging record getting synchronized | String |
| Sync State | Tracks if the state of the result of operation was reported back to hub client instance or not | String (with Choice list) 1) Ready 2) Synced |
| Operation | Operation to be executed for that staging record | String (with Choice list) 1) Insert/Update 2) Delete |
| Sync ID | ID of the staging record from the hub client instance being synchronized | String |

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cloud computing system comprising:
one or more data centers;
a hub client instance and at least one spoke client instance hosted by the one or more data centers; and
one or more communication networks over which the hub client instance and the at least one spoke client instance communicate;
wherein the cloud computing system is configured to:
generate a first spoke client instance as a first copy of the hub client instance;
enable one-way requests from the first spoke client instance to the hub client instance to update a plurality of spoke records of the first spoke client instance based on a change to a plurality of hub records of the hub client instance;
generate a second spoke client instance as a second copy of the hub client instance; and
enable two-way requests between the second spoke client instance and the hub client instance.

2. The cloud computing system of claim 1, wherein the cloud computing system is configured to prevent requests from the hub client instance from being sent to the first spoke client instance.

3. The cloud computing system of claim 1, wherein the cloud computing system is configured to enable one-way confirmation messages from the first spoke client instance to the hub client instance indicating a successful update of the plurality of spoke records based on the change to the plurality of hub records.

4. The cloud computing system of claim 1, wherein the cloud computing system is configured to enable one-way confirmation messages from the at least one spoke client instance to the hub client instance indicating an unsuccessful update of the plurality of spoke records based on the change to the plurality of hub records.

5. The cloud computing system of claim 1, wherein the first spoke client instance is configured to:
stop updating the plurality of spoke records when an error associated with updating a spoke record of the plurality of spoke records occurs;
provide a successful indication for each spoke record of the plurality of spoke records that were successfully updated;
provide an error indication for the spoke record for which the error occurred; and
provide a deferred status indication for each spoke record of the plurality of spoke records for which updating was not attempted.

6. The cloud computing system of claim 5, wherein the cloud computing system is configured to enable a one-way confirmation message from the first spoke client instance to the hub client instance indicating the successful indication for each spoke record of the plurality of spoke records that were successfully updated, the indication for the spoke record for which the error occurred, and the deferred status indication for each spoke record of the plurality of spoke records for which updating was not attempted.

7. The cloud computing system of claim 1, comprising:
a first set of client devices configured to access the hub client instance; and
a first set of client networks enabling communication with the hub client instance by the first set of client devices via the communication network.

8. The cloud computing system of claim 1, comprising:
a second set of client devices configured to access the first spoke client instance; and
a second set of client networks enabling communication with the first spoke client instance by the second set of client devices via the communication network.

9. A tangible, non-transitory, machine-readable-medium, comprising machine-readable instructions that, when executed by a processor, cause the processor to perform acts comprising:
storing, at a hub client instance hosted by one or more data centers of a cloud computing system, a plurality of changes to a plurality of objects of the hub client instance;
receiving, at the hub client instance, a request for the plurality of changes from a first spoke client instance hosted by the one or more data centers, wherein the first spoke client instance is generated based on the hub client instance, wherein the hub client instance is prevented from sending requests to the first spoke client instance, wherein the hub client instance is configured to send and receive the requests to a second spoke client instance; and
sending, at the hub client instance, the plurality of changes to the first spoke client instance.

10. The tangible, non-transitory, machine-readable-medium of claim 9, wherein the hub client instance is configured to receive messages from the first spoke client instance regarding the result of an operation on the first spoke client instance.

11. The tangible, non-transitory, machine-readable-medium of claim 10, wherein the first spoke client instance is configured to track that the operation result was reported back to the hub client instance.

12. The tangible, non-transitory, machine-readable-medium of claim 9, wherein the plurality of changes sent by the hub client instance is processed by the first spoke client instance on a first in first out basis.

13. The tangible, non-transitory, machine-readable-medium of claim 9, wherein the hub client instance is configured to receive a request for the plurality of changes from a third spoke client instance hosted by the one or more data centers, wherein the third spoke client instance is generated based on the hub client instance, and wherein the hub client instance is prevented from sending requests to the third spoke client instance.

14. The tangible, non-transitory, machine-readable-medium of claim 9, wherein the hub client instance is configured to determine if the first spoke client instance has permission to receive the plurality of changes from the hub client instance.

15. A first spoke client instance hosted by one or more data centers of a cloud computing system, wherein the first spoke client instance is copied from and communicatively coupled to a hub client instance and comprises:
   a plurality of spoke objects; and
   a plurality of spoke object tables configured to store attributes of the plurality of spoke objects, wherein the first spoke client instance is configured to:
      send a first request to the hub client instance for a plurality of changes to the plurality of spoke object tables;
      update the plurality of spoke object tables based on the plurality of changes; and
      send a confirmation to the hub client instance based on updating the plurality of spoke object tables, wherein the hub client instance is communicatively coupled to a second spoke client instance, wherein the hub client instance is configured to receive the first request from the first spoke client instance and is prevented from sending a second request to the first spoke client instance, and wherein the hub client instance is configured to receive the first request from the second spoke client instance and send the second request to the second spoke client instance.

16. The first spoke client instance of claim 15, wherein the hub client instance comprises:
   a plurality of hub objects; and
   a plurality of hub object tables configured to store attributes of the plurality of hub objects, wherein the plurality of hub object tables corresponds to the plurality of spoke object tables.

17. The first spoke client instance of claim 15, wherein the first spoke client instance is configured to send a successful confirmation to the hub client instance based on successfully updating the plurality of spoke object tables with respect to the plurality of changes.

18. The first spoke client instance of claim 15, wherein the first spoke client instance is configured to stop updating the plurality of spoke object tables with respect to the plurality of changes when an error occurs.

19. The first spoke client instance of claim 18, wherein the first spoke client instance is configured to send a third request to the hub client instance for changes of the plurality of changes to the plurality of spoke object tables that were not made due to the error.

20. The first spoke client instance of claim 16, wherein the cloud computing system is configured to prevent requests from the hub client instance to the first spoke client instance.

* * * * *